Feb. 11, 1958
C. R. GREY
2,822,723
PHOTOGRAPHIC EASEL
Filed Oct. 7, 1952
4 Sheets-Sheet 1
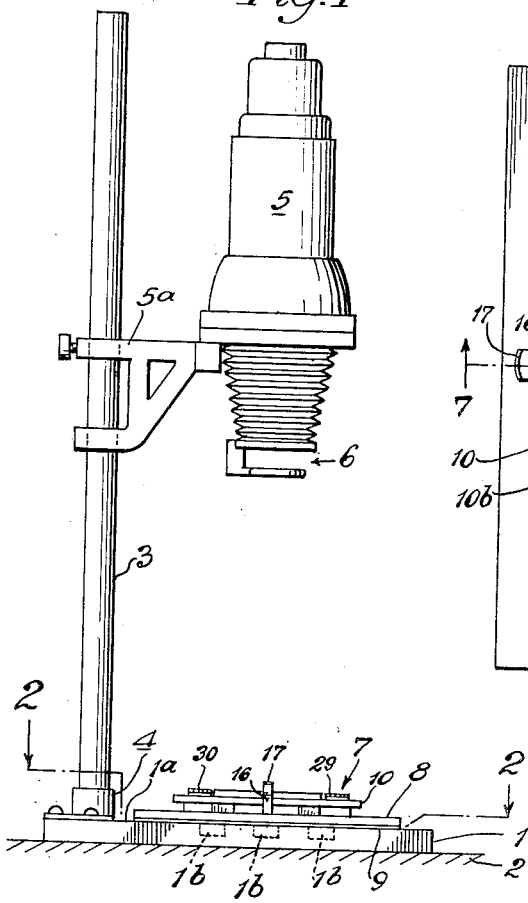
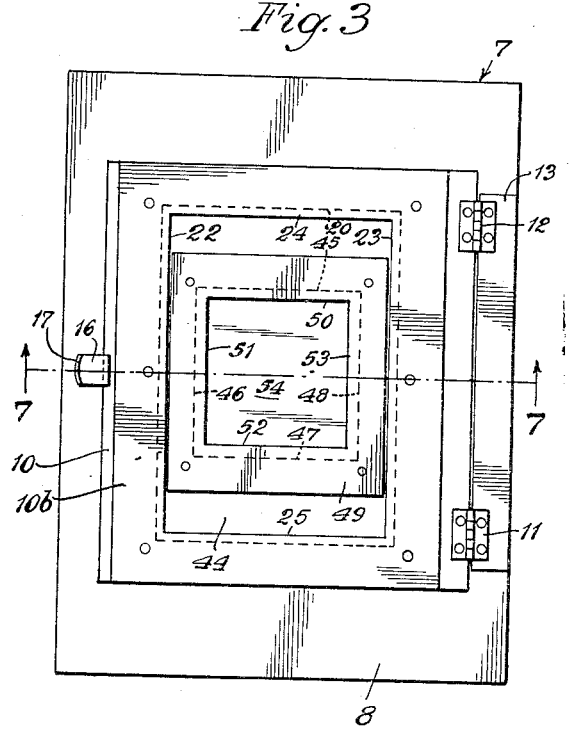
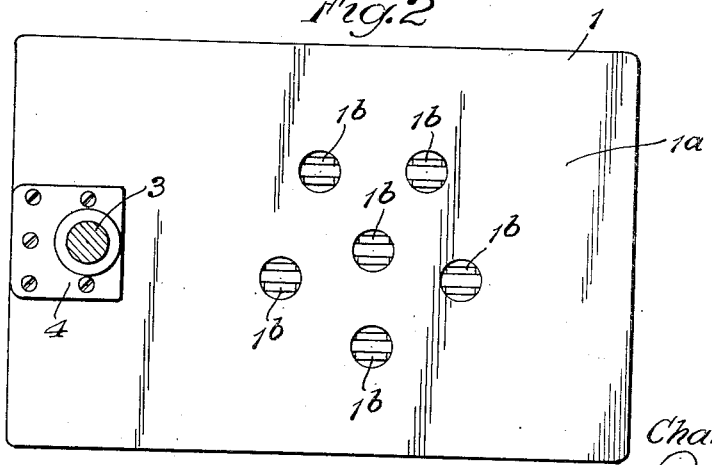
Inventor
Charles R. Grey
by
Attorneys Feb. 11, 1958     C. R. GREY     2,822,723
PHOTOGRAPHIC EASEL
Filed Oct. 7, 1952     4 Sheets-Sheet 2
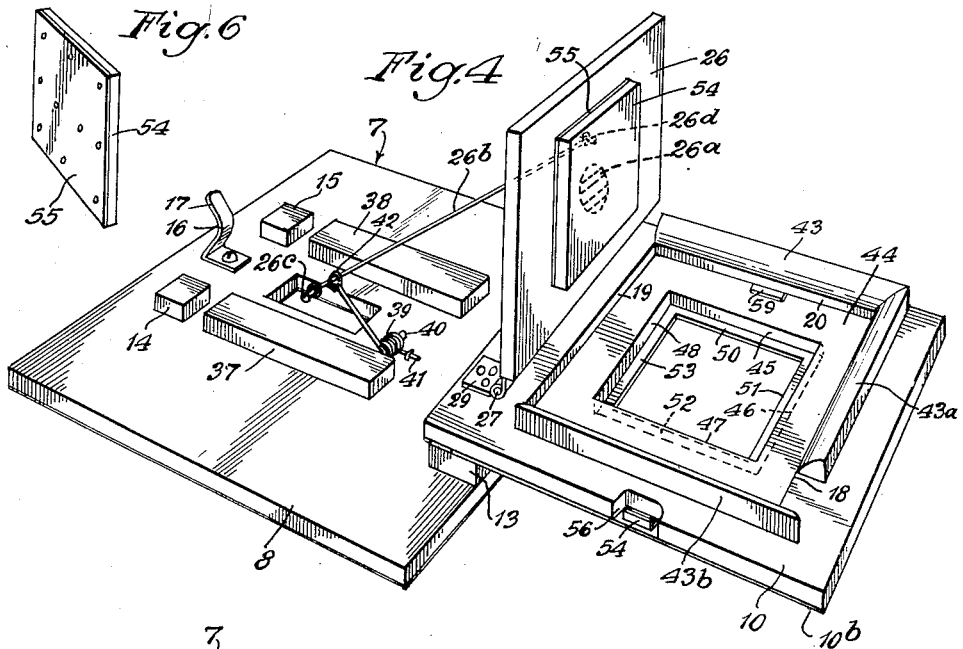
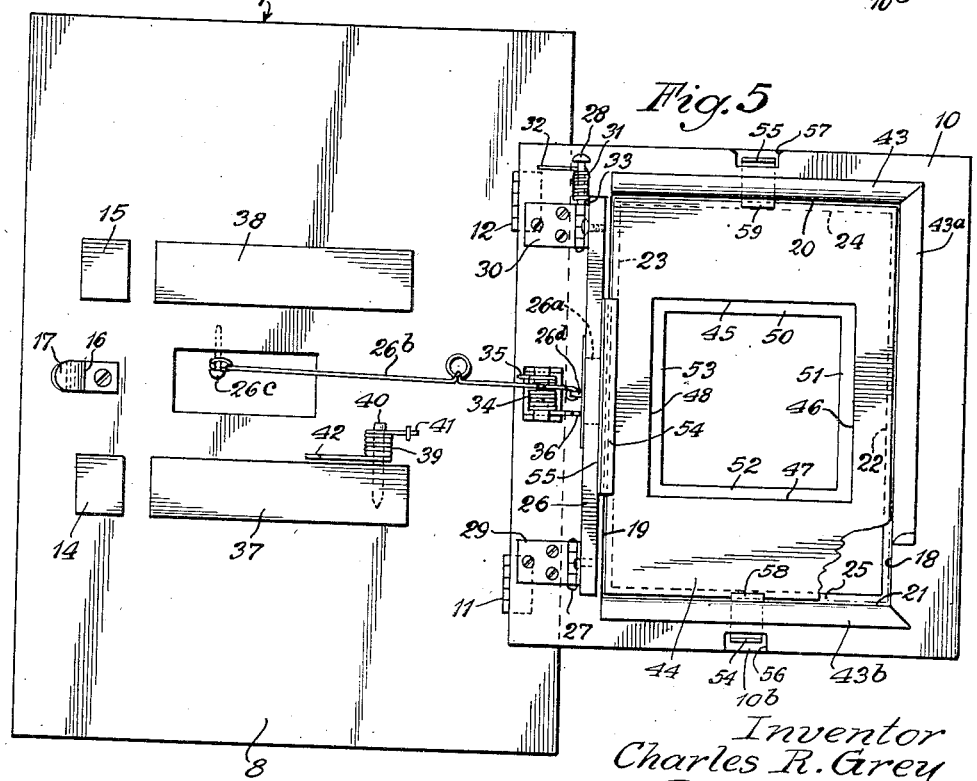
Inventor
Charles R. Grey
by Parker & Carter
Attorneys Feb. 11, 1958
C. R. GREY
2,822,723
PHOTOGRAPHIC EASEL
Filed Oct. 7, 1952
4 Sheets-Sheet 3
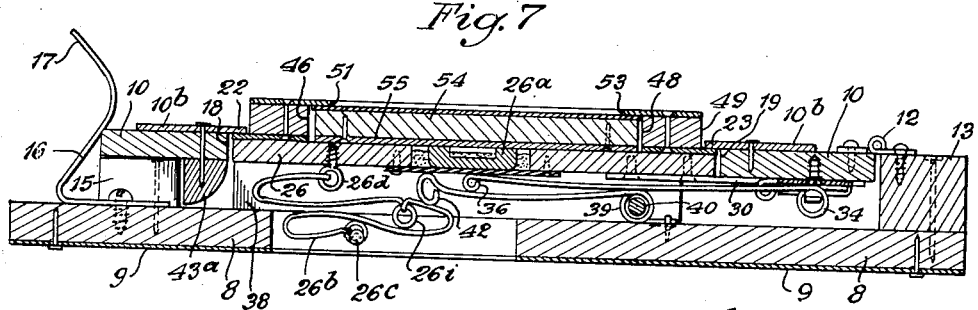
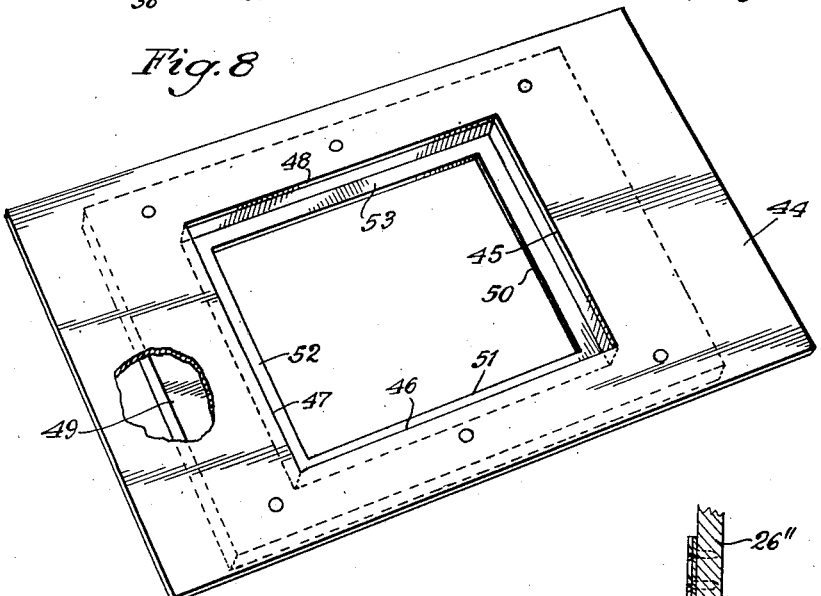
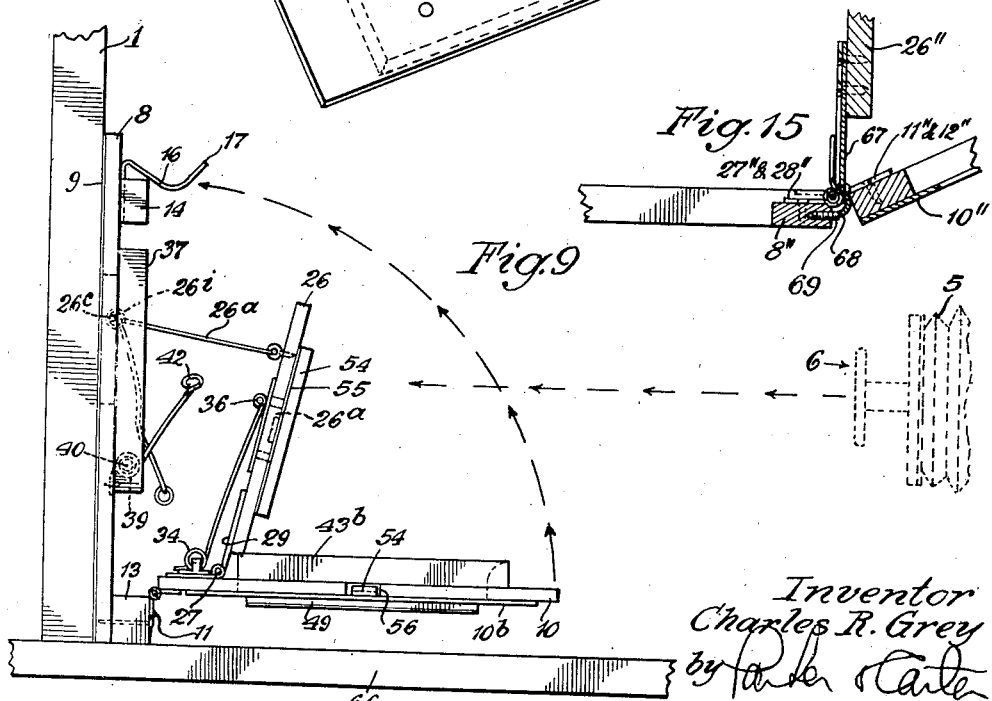
Inventor
Charles R. Grey
by Parker & Carter
Attorneys Feb. 11, 1958
C. R. GREY
2,822,723
PHOTOGRAPHIC EASEL
Filed Oct. 7, 1952
4 Sheets-Sheet 4
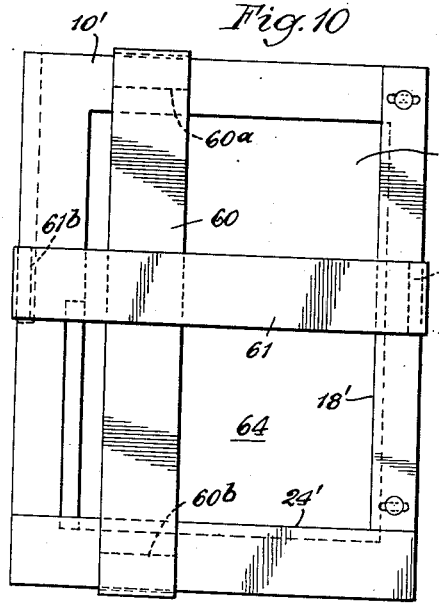
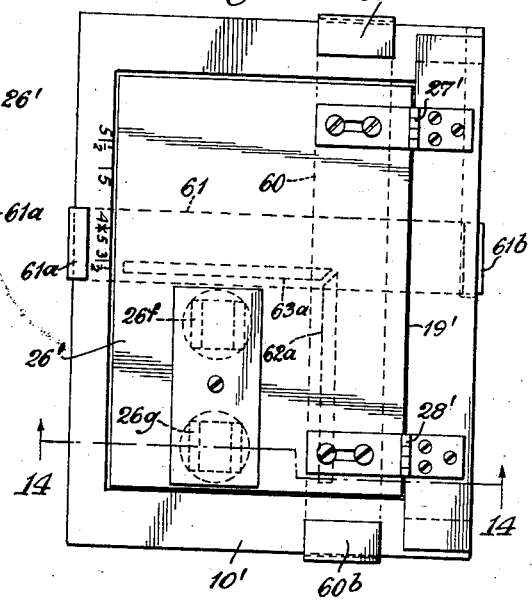
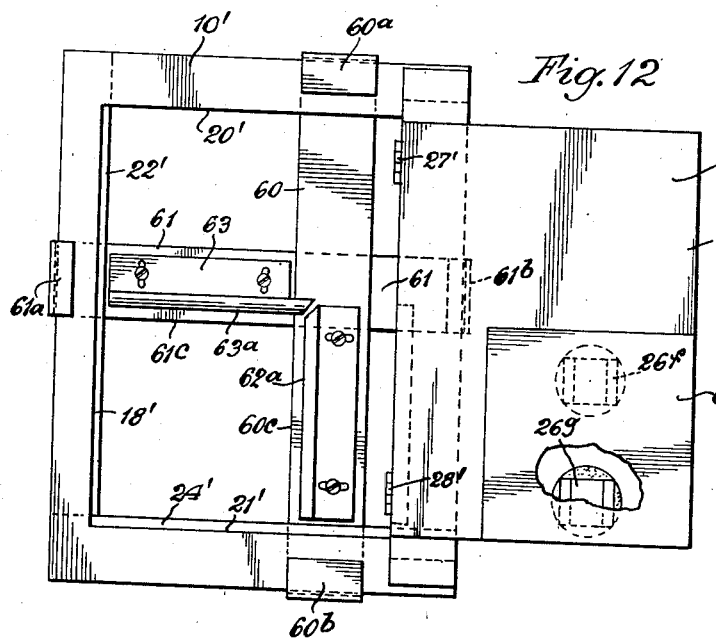
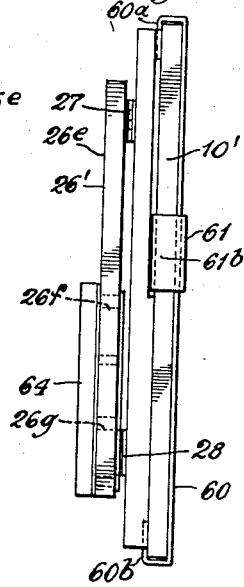
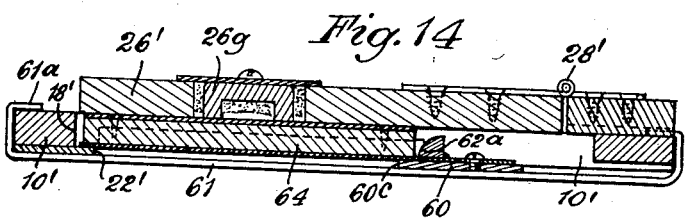
Inventor
Charles R. Grey
by
Attorneys United States Patent Office 2,822,723
Patented Feb. 11, 1958

2,822,723

PHOTOGRAPHIC EASEL

Charles R. Grey, Bentonville, Ark., assignor of one-half to Frances Marion Grey and one-half to John Allen Grey, Dewey, Okla.

Application October 7, 1952, Serial No. 313,445

3 Claims. (Cl. 88—24)

This invention relates generally to the art of positioning devices or easels for photosensitive paper which is used with photographic enlargers. In this art it is customary to employ a light source, negative to be reproduced and enlarging lens fixed some distance from photosensitive paper. The degree of enlargement of the image is dependent upon the magnitude of the enlarging lens and the distance of the enlarging lens from the photosensitive paper upon which the image is reproduced, as well as the distance of the lens from the light source. The use of this type of enlarging equipment, of course, requires the proper positioning of the photosensitive paper in the line of illumination of the enlarging device. With the use of either an enlarging lens having a vertical axis or an enlarging lens having a horizontal axis, some means must be provided for holding the photosensitive paper in its proper position to insure a clear print. It is undesirable to hold the paper in position manually since the hands of the operator invariably spoil the image and a high degree of skill is required to properly position the paper. When more than one print is desired, a great degree of laborious and time consuming effort is required for an operator of the enlarging equipment to properly position each individual piece of photosensitive paper within the positioning device. Broadly speaking, my invention contemplates a reduction in the laborious and time consuming efforts of the operator by reducing the complexity of manipulation required.

It is accordingly a primary object of my invention to provide a device which automatically positions each individual sheet of photosensitive paper for reception of the image required, with a minimum amount of operator positioning time.

Another object of my invention is to provide a photographic print holding device which has a photosensitive paper feeding position out of the line of illumination of the enlarger and a reproducing position in the line of illumination of the enlarger, thus requiring a minimum amount of time during which the paper is under the enlarger.

Another object of my invention is to provide a photographic print holding device with improved and novel means for accommodating the print holder to various sizes of prints.

Another object of my invention is to facilitate the handling of photosensitive paper from a feeding position to a reproducing position.

Other objects will appear from time to time in the course of the ensuing specification and claims.

Referring generally now to the drawings:

Figure 1 represents an assembly view showing my improved print holder in position with a photographic enlarger;

Figure 2 is an enlarged sectional view of the assembly shown in Figure 1 taken along the line 2—2 of Figure 1;

Figure 3 is a plan view of the improved print holder with the parts being in the photographic reproducing position;

Figure 4 is a perspective view of my improved device with the various component elements in a print feeding position;

Figure 5 is a plan view of my improved device with the various component elements shown in a print feeding position;

Figure 6 is a detail view of one of the elements employed in my device;

Figure 7 is a section view of the device as shown in Figure 3 taken along the section line 7—7 of Figure 3;

Figure 8 is a detail view of one of the elements employed with my improved device;

Figure 9 is an assembly view of my device as used with an enlarger having a lens with a horizontal axis;

Figure 10 is a plan view of one of the elements used in my device;

Figure 11 is a view of the device shown in Figure 10, but viewed from another side;

Figure 12 is a view of a device shown in Figure 11, with relative parts being shown in a print feeding position;

Figure 13 is a side elevational view of the device shown in Figure 12;

Figure 14 is a sectional view of the device as shown in Figure 11 taken along the line 14—14 of Figure 11; and Figure 15 is a partial view of a modified assembly.

Referring specifically now to the drawings wherein like parts are designated by like numerals throughout and referring in the first instance to Figure 1, 1 represents a base adapted to rest upon a table or the like indicated generally at 2. Preferably, an upstanding member 3 is preferably fastened to the base 1 by means of any suitable bracket 4. A conventional enlarger 5 having the usual lens 6 is mounted for vertical adjustment on the upstanding support member 3 by means of any suitable bracket 5a. It will be apparent that by adjusting the vertical distance of the enlarger 5 with relation of the base 1, the enlarger accommodates itself to a variety of sizes of enlarged prints in a well known manner. In vertical alignment with the axis of the lens 6 is my improved positioning device designated generally at 7. The positioning device or easel is adapted to hold a piece of photosentitive paper in position beneath the lens 6 of the enlarger 5. The easel 7 has a supporting member 8 provided with a sheet metal surface 9 in contact with the upper surface of the base 1.

The base 1 has a series of equally spaced, generally U-shaped magnets 1b embedded in the upper surface thereof. The magnets 1b have sufficient attracting strength to securely hold the supporting member 8 of the easel in position with respect to the enlarger 5 while at the same time allowing relative sliding movement of the supporting member 8 with respect to the base 1 to allow facile initial positioning of the easel with respect to the enlarger.

As will be seen best in Figure 4, my improved easel includes a print holder 10 pivotally mounted upon an upstanding portion 13 of supporting member 8 as at 11 and 12 by any suitable hinge members of conventional construction. The print holder is movable between a feeding position, shown in Figures 4 and 5, and a reproducing position, shown in Figure 3, the holder being swingable through an arc on the order of 180°. As thus formed, the print holder is adapted to receive photosensitive paper with the sensitive side downwardly and after swinging through this 180° arc into its reproducing position, the print holder presents the photosensitive paper with the sensitive face upwardly with relation to the enlarger, or exposed to illumination from the enlarger. Since photosensitive paper is generally stacked with the sensitive sides downwardly, in order to minimize exposure of these sides to undesirable light, the print holder conveniently receives the paper in this relative position and conveys it to a printing position with the sensitive side exposed.

The print holder 10 is generally rectangular in form and is of a sufficient thickness to be spaced above the upper surface of the supporting member 8 in the printing or reproducing position shown in Figures 3 and 7. A pair of abutment members 14 and 15 are joined to the supporting member 8 and serve to limit movement of the print holder to a position in which the upper plane surface of the print holder in the reproducing position is parallel to the plane of the lower surface of the supporting member 8. A spring latch member 16 is mounted on supporting member 8 and is adapted to hold the print holder in the reproducing position. The latch member 16 has a thumb piece 17 adapted, upon actuation thereof, to move the latch member 16 outwardly away from the print holder to release the print holder for movement to its feeding position. The print holder 10 is provided with a generally rectangular recess or opening defined by sides 18, 19, 20 and 21. Retaining ledges 22, 23, 24 and 25 are formed generally continuous with the surface 10b of the print holder and extend a slight distance into the recess defined by the walls. In operation, the size of the recess defines the size of paper employed and the retaining ledges serve to hold a piece of photosensitive paper with the photosensitive side down in the feeding position shown in Figure 4. These ledges serve also to define the border of an image reproduced by the enlarging apparatus.

A platen 26 is pivotally mounted upon the print holder 10 at 27 and 28 by means of any suitable hinge members 29 and 30. The platen 26 is of the same size as the recess defined by the four walls 18, 19, 20 and 21. In operation, the platen 26 serves as a backing member for the photosensitive paper placed in the recess in the print holder. Platen 26 carries a generally U-shaped bar magnet 26a for a purpose which will be pointed out in ensuing portions of the specification. A flexible stop member 26b is fixed to the supporting member 8 as at 26c and to the platen 26 as at 26d. The flexible stop member 26b is so formed as to hold and limit movement of the platen 26 to a generally upright position as the print holder 10 is moved to its feeding position. Any suitable coiled spring 31 may be disposed about pivot 28 and have opposed ends abutting the print holder 10 as at 32 and the platen 26 as at 33 for the purposes of biasing the platen 26 toward a position where it lies within the recess of the print holder 10. Where desired, an additional coiled spring member 34 may be mounted on print holder 10 and have opposed ends 35 and 36 abutting the print holder 10 and platen 26 to aid in biasing platen 26 toward the recess of the print holder 10. A pair of abutment members 37 and 38 are formed on supporting member 8 to limit movement of the platen 26 to the printing position shown in Figure 7.

Any suitable spring 39 may be employed to bias the print holder and platen assembly toward the feeding position. As shown, the spring is in the form of a coiled spring surrounding a projection 40 on abutment member 37 and having an opposed end 41 abutting the supporting member 8 and another end 42 abutting the platen member 26. If desired, suitable guiding members 43, 43a and 43b may be disposed along the edge of the recess and the print holder 10 to aid in guiding photosensitive paper into the recess.

In operation, the print holder and supporting member assembly are disposed in the feeding position shown in Figure 4. An operator places a piece of photosensitive paper, with the sensitive side down, in the print holder on the ledges 22, 23, 24 and 25. The print holder 10 is then swung over toward its printing or reproducing position shown in Figures 3 and 7. As the print holder 10 approaches the intermediate portion of its swinging movement where it is in a generally upright position, the recess defined by the four walls 18, 19, 20 and 21 enclose the platen 26 and the platen in that position serves to hold the photosensitive paper in place in the print holder. The swinging movement is continued to the printing or reproducing position shown in Figures 3 and 7 where latch member 17 may engage the print holder 10 and hold it in position. Springs 31 and 34 hold the platen tightly against the paper between the printing position and intermediate upright position. The photosensitive paper with its sensitive side up is exposed by the enlarger 5. After the time of exposure has elapsed, the latch member 16 is released and the print holder 10 and platen are swung back toward the feeding position. As the print holder 10 and the platen move into the intermediate upright position, the movement of the platen 26 is limited by the stop member 26b. As the print holder 10 moves away from the platen in continuing its swinging movement toward the feeding position, the paper tends to remain with the platen 26 for a small portion of time, due to suction existing between the paper and the platen 26. The paper then falls away from the platen 26 and may be removed by the operator of the apparatus and another piece of nonexposed paper is positioned in the print holder 10 for the start of another printing operation.

My improved photographic easel includes means for accommodating itself to a wide variety of sizes of photosensitive paper. As formed, the walls 18, 19, 20 and 21 of the recess and the print holder define the maximum size of the photosensitive paper which the apparatus can accommodate. However, the print holder 10 and platen are adapted for operation with a wide variety of sizes of photosensitive paper.

In Figures 3 through 8 inclusive, I show one such means of multi-sized accommodation. Figure 8 shows an element adapted to be disposed within the recess in the print holder and rests on the supporting ledges 22, 23, 24 and 25. A thin sheet of material, generally rectangular in form, is adapted to fit snugly within the recess and the print holder 10. This sheet includes a cutaway rectangular portion bounded by sides 45, 46, 47 and 48. The recess may be formed of any size smaller than the rectangle defined by the sheet 44 to accommodate a wide variety of sizes of photosensitive paper. A rectangular reinforcing element 49 is disposed on the underside of the sheet 44 and is provided with a cutaway portion which matches the cutaway portion or recess of the sheet 44. Paper retaining ledges 50, 51, 52 and 53 are joined to the underside of the reinforcing member 49 and extend into the recess defined by the walls 45, 46, 47 and 48. An auxiliary backing member 54, as seen in Figure 6 is provided with a sheet metal surface 55. This auxiliary backing member 54 is formed of a sufficient size to rest snugly within the recess defined by the walls 45, 46, 47 and 48. The auxiliary backing member 54 is held in position on the platen 26 by means of the attractive force between the magnet 26a on the platen and the sheet metal surface 55. When this embodiment is used, backing member 54 holds the photosensitive paper in position in the recess in the sheet 44. It will be apparent that any number of sizes of sheets 44 and corresponding auxiliary backing members 54 may be employed for any size of photosensitive paper less than the maximum size defined by the walls 21, 22, 23 and 24 of the recess in the print holder.

Suitable tabs 54 and 55 having retaining edges 58 and 59 may be slidably mounted in openings 56 and 57 in the print holder 10 for holding the sheet 44 in position.

In Figures 10 through 14, inclusive, I show another means for accommodating various sizes of paper less than the maximum size defined by the recess in the print holder. In this instance a platen 26' is pivotally mounted as at 27' and 28' on a print holder 10' for movement between a feeding and printing position shown in Figure 12 and Figure 11 respectively. The platen has a backing surface 26e adapted to lie in the general plane of the upper surface of the print holder 10' as shown in Figure 14. The print holder has a rectangular recess or opening defined by walls 18', 19', 20' and 21'. Paper retaining ledges 22' and 24' are disposed on the underside of the print holder and extend into the recess.

In this embodiment a pair of adjustable elements 60 and 61 are employed to define a recess for various sizes of paper. These elements 60 and 61 are preferably in the form of flat pieces of sheet metal and are disposed on the underside of the print holder in the feeding position. The adjustable elements 60 and 61 have U-shaped end portions 60a, 60b, 61a and 61b which grip the sides of the print holder 10'. As thus mounted, the adjustable elements are adapted for sliding movement transversely of their length to define various sizes of recesses. A paper guiding element 62 is mounted on the element 60 and a paper guiding element 63 is provided on the element 61. These elements have edge portions 62a and 63a spaced a slight distance from the edges 60c and 61c of the elements 60 and 61. Edge portions 60c and 61c of the elements together with the retaining ledges 22' and 24' of the print holder define the effective recess in the print holder. The platen 26' is provided with generally U-shaped magnets embedded within the surface of the platen 26' as at 26f and 26g. An auxiliary backing member 64 is provided with a metallic surface adapted to be attracted by the magnets 26f and 26g. It will be apparent that any size of auxiliary backing member 24 may be employed to fit snugly within the recess defined by the ledges 22', 24', and adjustable elements 60 and 61.

In Figure 9, I show how my improved photographic easel may be employed with an enlarger having a lens in a horizontal position. When used in this way, the base 1 is disposed in a generally vertical position on a table 66 along with the supporting member 8 which is held thereto by the magnet 1b. In this instance, the effective length of the flexible stop member 26a is shortened by utilizing a ring 26i which is fastened to member 26c on the supporting member 8 in order to limit movement of the platen to a position just beyond the vertical, as will be apparent in Figure 9. The base 1 may be supported on any suitable supporting member 66. Movement of the print holder 10 is limited by the supporting member 66. When used in this fashion, the operation of the easel is the same as in the other figures, the paper being placed with the sensitive side down in the print holder 10, and the print holder is then moved to the printing position which in this instance is vertical.

In Figure 15, I show another means for limiting movement of the platen to the intermediate position in place of the flexible stop member 28. The supporting member is designated generally at 8''. The print holder is designated generally at 10'' and the platen member is designated at 26''. As in the case of the other figures, the print holder 10'' is pivoted to the supporting member 8'' by means of any suitable hinges 11'' and 12'' and the platen is hinged to the print holder by means of any suitable pivot or hinges 27'' and 28''. In this embodiment, however, a stop member 67 is formed integrally with the platen 26'' and when the platen reaches the upright or intermediate position, a portion 68 of the stop member contacts an adjustable screw 69 to limit movement of the platen.

While no specific material for the supporting member, print holder and backing members is critical, it will be apparent that wood or suitable plastics may be employed for fabricating these members.

While it will be realized that I have shown and illustrated an operative device, I wish it to be understood that this showing is to be taken as in a diagrammatic sense rather than in any limiting sense and that many variations of the device within the spirit of the invention are possible within the scope of the hereinafter appended claims. The scope of the invention therefore should be limited only by the scope of the hereinafter appended claims.

The use and operation of my invention are as follows:

The base 1 is positioned in the line of illumination of the enlarging device 5. The enlarging device 5 may be mounted integrally with the base 1 or may be mounted separately from the base 1. The supporting member 8 is properly positioned in this line of illumination and is held in position by means of the magnet 1b and the metal surface 9 of the supporting member. It will be understood that by means of the metallic surface 9 and the magnet 1b the supporting member 8 may be conveniently adjusted with relation to the line of illumination and the axis of the lens 6 of the enlarger. The print holder is swung over into the feeding position shown in Figure 4, which is out of the line of illumination of the enlarger 5. Assuming that an operator desires to operate the easel with his left hand and the enlarger with his right hand, the operator grasps a piece of photosensitive paper from any suitable stack of such paper and positions it within the recess formed in the print holder 10. With this same hand, the operator can then swing the print holder over into the feeding position where the apparatus is positioned for exposing the paper to the image. The platen at that time serves to hold the photosensitive paper with the sensitive side up firmly against the ledges formed around the edges of the recess. When in the printing position, the operator can then switch on the enlarger with his right hand and leave the enlarger on for the correct time of exposure. After this time has elapsed, the enlarger is switched off and the operator may conveniently, with his left hand, release the latch 16 and swing the print holder and platen over toward the feeding position. As the print holder swings back toward the feeding position, the platen 26 tends to hold the photosensitive paper in a generally upright position adjacent the platen 26 by reason of a suction force between the platen and paper. The photosensitive paper in the exposed condition may then be removed by the operator of the easel and placed in any suitable developing bath. The operator can then place another piece of photosensitive paper in the recess in the print holder and commence another printing operation.

The apparatus is so formed that it may be conveniently utilized with an enlarger having a lens disposed with its axis in a vertical position or with an enlarger having its lens disposed with its axis in a horizontal position, as shown in Figure 9.

The simple construction involved lends itself to convenient adaptability to a wide variety of sizes of photosensitive paper. It may, for example, be employed with the elements 44 and 54, shown in Figures 8 and 6 respectively, which may be of any size less than the recess formed in the print holder 10 in order to vary the effective size of the recess. The effective size of the recess may be varied also by means of the adjusting elements 60 and 61 shown in Figure 12 and the auxiliary platen 54, shown in that figure.

I claim:

1. A photographic print holding device including a generally horizontal supporting member, a photosensitive paper holder swingably mounted on said supporting member, said holder being movable between a generally horizontal paper receiving position spaced from said supporting member and a generally horizontal paper printing position adjacent said supporting member, and a platen movably mounted on said paper holder, said platen being formed and adapted to act as a backing member for said paper in the printing position, said platen being limited in movement between a generally upright position and a generally horizontal position adjacent said supporting member.

2. A photographic print holding device including a supporting member, a photosensitive paper holder movably mounted on said supporting member, said holder being movable through an arc on the order of 180° between a paper receiving position spaced from said supporting member and a printing position adjacent said supporting member, said paper holder having an opening formed and adapted to receive photosensitive paper, a platen movably mounted on said holder for movement between said printing position and a position intermediate said printing position and said feeding position, said platen being of a size sufficient to fit within said opening for acting as a backing member for said paper, whereby movement of said holder toward printing position forces said opening and platen together to thereby retain said paper in said opening, said platen being effective, when said holder moves away from said platen toward paper receiving position, to remove paper from said opening.

3. A photographic print holding device including a supporting member, a photosensitive paper holder movably mounted on said supporting member, said holder being movable through an arc on the order of 180° between a paper receiving position spaced from said supporting member and a printing position adjacent said supporting member, said paper holder having an opening formed and adapted to receive photosensitive paper, a platen positioned between said holder and said supporting member and adapted for movement between said printing position and a position intermediate said printing position and said feeding position, said platen being of a size corresponding generally to the size of said opening, said platen being movable through an arc corresponding to the arc of movement described by said opening when said holder moves from the printing position to a position intermediate said printing position and said feeding position, means biasing said platen toward said opening, means limiting movement of said platen to said intermediate position, movement of said holder toward printing position being effective to force said platen into said opening to thereby retain said paper in said opening, said platen being effective, when said holder moves away from said platen toward paper receiving position, to remove paper from said opening.

References Cited in the file of this patent

UNITED STATES PATENTS

| | | |
|---|---|---|
| 1,214,132 | Carleton | Jan. 30, 1917 |
| 1,557,468 | Mountigny | Oct. 13, 1935 |
| 2,205,480 | Kidwell | June 25, 1940 |
| 2,427,860 | Jensen | Sept. 23, 1947 |

FOREIGN PATENTS

| | | |
|---|---|---|
| 540,700 | Great Britain | Oct. 27, 1941 |